United States Patent [19]

Sugimura

[11] Patent Number: 4,509,557

[45] Date of Patent: Apr. 9, 1985

[54] ACCUMULATOR

[76] Inventor: Nobuyuki Sugimura, 308 Mabase, Shimizu-Shi, Shizuoka-ken, Japan

[21] Appl. No.: 512,035

[22] Filed: Jul. 8, 1983

[51] Int. Cl.[3] .............................................. F16L 55/04

[52] U.S. Cl. ..................................... 138/30; 220/85 B

[58] Field of Search ......................... 138/30; 220/85 B

[56] References Cited

U.S. PATENT DOCUMENTS

| | | | |
|---|---|---|---|
| 2,397,796 | 4/1946 | Lippincott | 138/30 |
| 2,532,143 | 11/1950 | Breit | 138/30 |
| 3,174,658 | 3/1965 | Wittenberg et al. | 138/30 X |
| 3,674,053 | 7/1972 | Murman et al. | 138/30 |
| 3,788,358 | 1/1974 | Taki | 138/30 |
| 3,960,178 | 6/1976 | Mercier | 138/30 |
| 3,983,902 | 10/1976 | Lord | 138/30 |
| 4,177,836 | 12/1979 | Thompson | 138/30 |

FOREIGN PATENT DOCUMENTS

| | | | |
|---|---|---|---|
| 1487445 | 7/1967 | France | 138/30 |

*Primary Examiner*—James E. Bryant, III

*Attorney, Agent, or Firm*—Wood, Dalton, Phillips, Mason, & Rowe

[57] ABSTRACT

An accumulator comprises a pressure vessel having a detaining step, a bladder inserted therein and provided with a flange, and a threaded plug to close the opening of said pressure vessel, said threaded plug having a downward projection to be inserted into the inner side of the opening of the bladder, and said projection and said opening of the bladder each being provided with a tapered or similarly curved periphery which is tightly to contact together at the final moment of screwing down the plug while to provide a clearance between them at the stage other than that moment so as the bladder not to be forced to turn by the rotation of the plug.

3 Claims, 6 Drawing Figures

ACCUMULATOR

This invention relates to an accumulator in which the bladder is not forced to turn by the rotation of the plug.

In the conventional accumulator comprising a pressure vessel, a bladder inserted therewithin through the opening of the pressure vessel and provided with a flange which is to be placed upon the detaining step of the pressure vessel, and a plug being fitted into said pressure vessel and provided with a projection which is to extend into the opening of the bladder, as the fitting surfaces of both said projection and the inner side of the bladder were, as shown in FIG. 6, vertical straight so that they were always contacting each other throughout from the initial to the final stage of screwing-down the plug; lubricant agent was applied, in setting the plug into the pressure vesel with its projection sliding down along the inner periphery of the opening of the bladder so as the bladder was not forced to turn by the rotation of the plug and to thereby avoid occurrence of the torsion in the flange of the bladder so that even if the plug was made of material that was frail against torsion the bladder was not damaged.

In loosening the plug to disassemble the accumulator after a long period of operation, however, the flange portion of the bladder was twisted by the plug because the lubricant agent dried up prior to the time and, consequently, shearing force occured at the area between the moving flange and the stationary bladder main body held by the detaining step and unable thereby to turn, then the flange portion was torn off therefrom. The vertically contacted plane between the opening of the bladder and the projection could, at the same time, not improve their air-tight ability because no radial pressure force occurred in said plane when the flange was imparted with vertical pressure by the screwing-down of the plug.

The present invention is designed to solve the above-mentioned problems in the prior art and relates to an accumulator comprising a pressure vessel, a bladder therein provided with a flange held by a detaining step in the pressure vessel to support said bladder, and a threaded plug to close the opening of said pressure vessel, said threaded plug having, at its bottom, a projection to be inserted into the inner side of the opening of the bladder, said projection being provided with a tapered or similarly curved circular periphery which is tightly to contact with the flange of the bladder at the final stage of screwing down the plug while to provide a clearance between said periphery and said flange at the initial stage of insertion of the plug so the flange will not to be forced to turn by the rotation of the plug and to thereby enable the projection to tightly contact against the flange of the bladder at the final stage of screwing down the plug thereby improving the air-tight ability by compression force generated by the plug across the bladder to the accumulator body.

Above-mentioned object and feature of the present invention will be more apparent as the embodiment proceeds with reference to the embodiments illustrated in the drawings in which FIG. 1 is a longitudinal cross section of an accumulator of the present invention.

Figure 1:
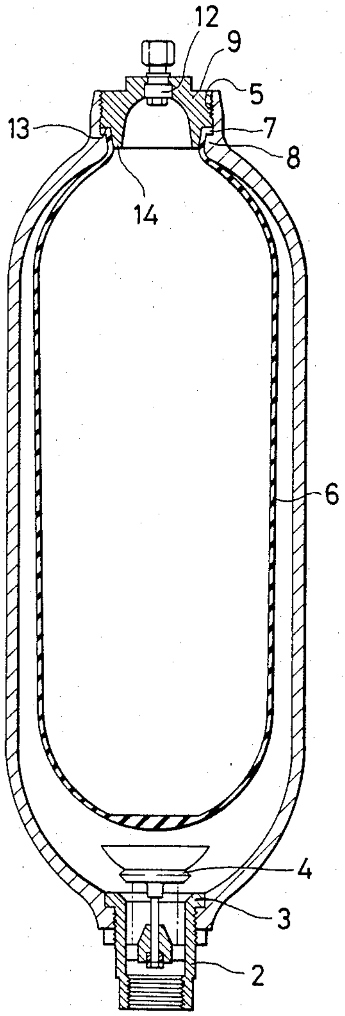
Figure 2:
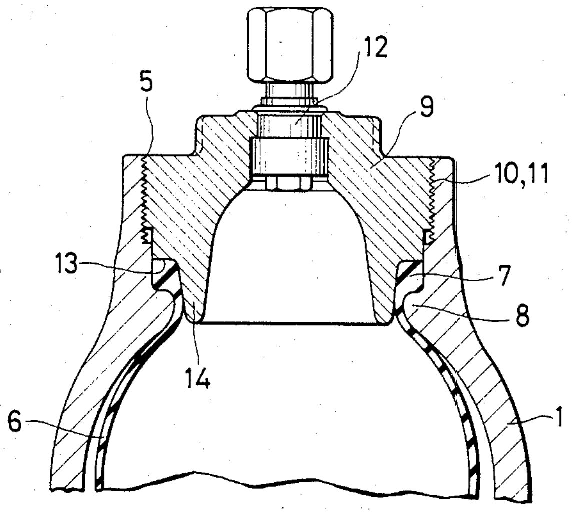
FIG. 2 is a partial enlarged cross section of a part of the accumulator shown in FIG. 1.

In these Figures, 1 is a pressure vessel of an accumulator made of adequate metal corresponding to the pressure used therefor and a sausage appearance in shape as shown in FIG. 1, comprises a liquid port 2 in its bottom provided with a valve seat 3 at its inner end, a valve 4 to close or open said valve seat 3, an opening 5 at its top through which a bladder 6 is to be inserted into the pressure vessel. 6 is a bladder made of natural or synthetic rubber or the like, having a shape similar to that of the pressure vessel 1 and provided with a flange 7 at its top which also works as a packing or sealing member. The bladder is inserted into the pressure vessel 1 with its flange 7 being held by a detaining step 8 provided at said opening 5 of the pressure vessel 1. 9 is a plug having the external thread 10 at its periphery which is to be fitted with the internal thread 11 in order to close the opening 5 of the pressure vessel 1 and provided with a valve 12 at its center of the top. The plug has a push edge or surface 13 which is intended to contact the upper face of the opening of the bladder 6, and a circular projection 14 which is to extend into the inner side of the opening of the bladder 6. The inner side of the opening of the bladder 6 and the periphery of the projection 14 are so formed that the contacting plane of them is either inwardly inclined for $\theta$ degrees from a vertical line as shown in FIG. 3, or formed by two differently inclined portions, the one at the top side of the projection inclining for $\theta_1$ degree and another at the base side for $\theta_2$ degree as shown in FIG. 4, or formed by parabolic arch or the like in proportion to and generally of the shape of the above two-step taper as shown in FIG. 5.

Figure 3:
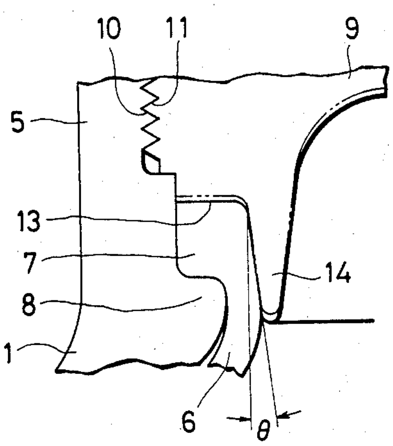
FIG. 3 is a partial enlarged cross section of a portion of FIG. 2.
Figure 4:
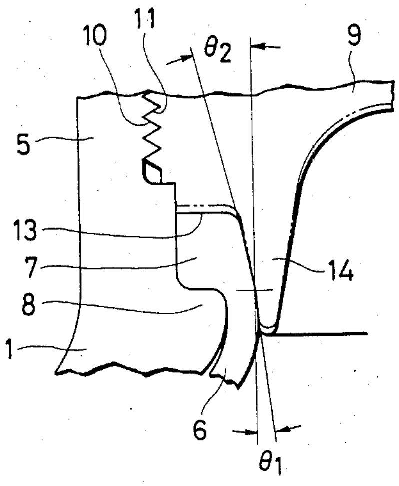
FIG. 4 is a partial enlarged cross section of another embodiment the part shown corresponding to the part of first embodiment that is shown in FIG. 3.
Figure 5:
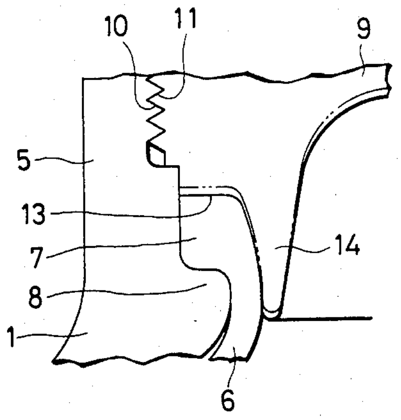
FIG. 5 is a partial enlarged cross section of further embodiment the part shown corresponding to the part of first embodiment that is shown in FIG. 3.
Figure 6:
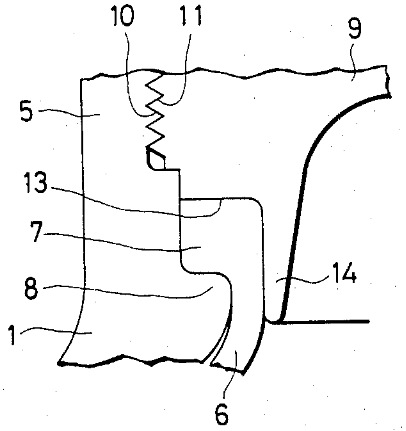
FIG. 6 PRIOR ART
FIG. 6 is a partial enlarged cross section of prior art.

These angles $\theta$, $\theta_1$, $\theta_2$ of the plane tapered or likely formed can be arbitrary selected as long as they produce, in closing the plug, the clearance between the opening of the bladder 6 and the projection 14 avoiding thereby the friction between them as shown by dotted line in FIGS. 3 and 4, while, in tightening up the plug 9, they firmly contact with each other producing thereby air-tight closure as shown by solid line in FIGS. 3 and 4.

For example $\theta$ is, in FIG. 3, 3° to 30°, perferably 5° to 15° for practical use, $\theta_1$ is, in FIG. 4, preferably determined as 2° to 10°, and $\theta_2$ as 5° to 30°. The subject surface in FIG. 5 is obtained by forming the two-step tapered portion shown in FIG. 4 into a parabolic upright curve throughout the circular surface on the plug.

One of the embodiments of the present invention in which the bladder is not forced to turn by the rotation of the plug has such structure as described above, when the bladder 6 is, in assembling the accumulator, inserted into the pressure vessel 1 through its opening 5 in a manner that its flange 7 is supported by the detaining step 8 and then the external thread 10 of the plug 9 is screwed into the internal thread 11 of the opening 5, a clearance is always obtained between the opening of the bladder 6 and the projection 14 of the plug 9 until near the final moment of screwing down the plug 9 as the projection 14 has the inwardly tapered or similarly curved plane so that the bladder 6 will not be forced to turn by the friction between the projection 14 and the same.

At the final moment of screwing down the plug 9, however, the projection 14 begins to contact with the inner side of the opening of the bladder 6 so thereby as to produce an air-tight sealing between them and to thereby firmly fasten the flange 7 of the bladder 6 because it is held between the pressure vessel 1 and the plug 9 from all directions, and consequently an accumulator in which the bladder 6 divides the pressure vessel into the air compartment and liquid compartment is built up to effectively serve accumulating or bumping action or the like for pressurized liquid.

In the prior art, the lubricant agent applied to the flange of the bladder at initial assembling stage of the conventional accumulator dried out after use for long time of period and so the projection 14 sticked to and didn't move apart from the bladder. The present invention, however, provides taper opposite both the opening of the bladder 6 and opposite the projection 14 so that the projection 14 can move apart out of the opening of the bladder 6 at the moment the plug is unscrewed thus avoiding the friction between the bladder 6 and the projection 14. Consequently the bladder 6 won't be forced to turn by the rotation of the projection 14 and avoids being imparted with torsion. So the bladder 6, ever if made from such material as is vulnerable to torsion, will not be damaged at loosening the plug and can be used repeatedly.

As mentioned above, in the accumulator of the present invention in which the bladder will not be forced to turn by the rotation of the plug, tapered or similarly curved plane surfaces are provided both at the opening of the bladder and at the projection of the plug to produce a clearance between them while closely contacting the bladder flange at closing up the plug, so that, in turning the plug either to assemble or to disassemble the accumulator, there may occur a slight friction between the projection and the bladder only at the initial and final moment of screwing the plug while yielding no friction at any stage other than above owing to the clearance between them.

Furthermore, not only the damage of the bladder caused by the turning of the plug in the prior art can be completely prevented, but also this structure improves the air-tightening ability as the close contact between the plug and the projection is intensified because the tapered or similary curved plane of the projection 14 compresses the opening of the bladder at the final moment of closing up the plug.

What is claimed is:

1. A hydraulic accumulator of the type that comprises a pressure vessel having a threaded opening, its interior divided by resilient bladder into a gas compartment and a liquid compartment that are sealed from one another, and a threaded plug to removably fit into the opening of said pressure vessel, said accumulator being characterized by:

A. said bladder comprising an opening and a surrounding outwardly extending enlarged flange, said bladder having an inner surface defining the opening and having an inwardly radial upper surface on the flange and an adjoining tapered or curved opening periphery;

B. said pressure vessel having a detaining step upon which said flange of the bladder is placed to support the bladder;

C. said plug being provided with a radial surface and an adjoining downward projection to trap said bladder flange, said projection having an inwardly tapered or curved periphery having a shape mating with the shape of said bladder inner surface defining the opening, wherein said plug projection periphery will tightly contact with and compress said periphery of the bladder at the final moment of screwing down the plug radial surface against the bladder radial surface while providing a clearance between them at any stage other than that final moment so that the flange is not required to be forced to turn by the rotation of the plug.

2. An accumulator of claim 1 wherein said plug projection tapered periphery consists of two portions, the one at upper side of the projection having angle $\theta_1$ between 2° and 10° from vertical line and another at the base of it having angle $\theta_2$ between 5° and 30°.

3. An accumulator of claim 1 wherein said curved periphery of the bladder opening and plug projection each has a mating parabolic curve.

* * * * *